Oct. 20, 1942.        H. KLEMPERER         2,299,094
                      ELECTRICAL APPARATUS
             Filed March 11, 1939        2 Sheets-Sheet 1

Inventor
Hans Klemperer
by
Ezekiel Wolf
his Attorney

Oct. 20, 1942.   H. KLEMPERER   2,299,094
ELECTRICAL APPARATUS
Filed March 11, 1939   2 Sheets-Sheet 2

Inventor
Hans Klemperer
by Ezekiel Wolf
his Attorney

Patented Oct. 20, 1942

2,299,094

UNITED STATES PATENT OFFICE 2,299,094

ELECTRICAL APPARATUS

Hans Klemperer, Belmont, Mass., assignor to Raytheon Manufacturing Company, Newton, Mass., a corporation of Delaware Application March 11, 1939, Serial No. 261,399

20 Claims. (Cl. 250—27.5)

The present invention relates to a high voltage rectifier or inverter device. Such devices may employ a transformer with several high voltage windings and a multiple of electronic gas filled tubes of the single anode type, the tubes and transformer being assembled in an oil cooled transformer tank.

In high voltage systems the use of hot cathode tubes and ignitron tubes appears to be impractical because of the necessity of providing highly insulated heater transformers for maintaining the hot cathode or other igniter firing means. Moreover the limited life of these hot cathodes endanger the applicability of the whole scheme at least for power purposes. For these reasons power systems based on the use of rectifier tubes for the production of high voltage or using high voltage have had definite limitations.

In the present invention electronic gas filled tubes are used with an auxiliary electrode for igniter purposes. Such ignition may be obtained by the use of dielectric means or with direct electronic control as will appear later. In particular, a glass igniter tube may be used in which the auxiliary conducting electrode is separated from the cathode by dielectric means, such as glass, quartz, or other suitable material. Such glass igniter tubes use relatively high voltages, around 1 kv. and an extremely small current (about $5 \times 10^{-6}$ amperes) for starting the discharge of the arc between the solid anode of the tube and the mercury pool cathode. Particularly no rectifier means are needed between the starter and the suuply line.

The advantage of the system in the present invention is that no separate heating or firing means are necessary and no heating transformer is necessary and as a result the difficulties of insulation are greatly overcome.

Besides this, the control is positive and as will be noted from the description below may be designed for more efficient rectification or conversion as the case may be.

The invention will be more clearly understood in connection with the drawings in which.

Figure 3:
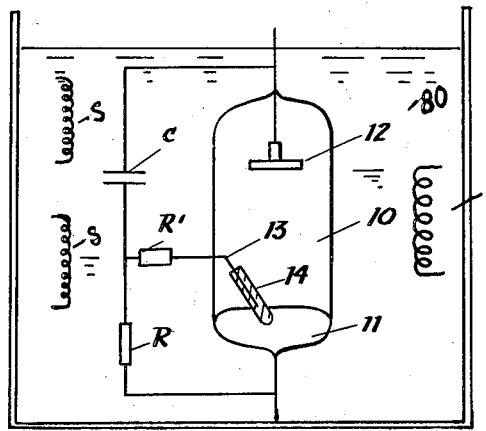
Figure 3 shows schematically a detail of the glass igniter tube and its connections in circuit.
Figure 4:
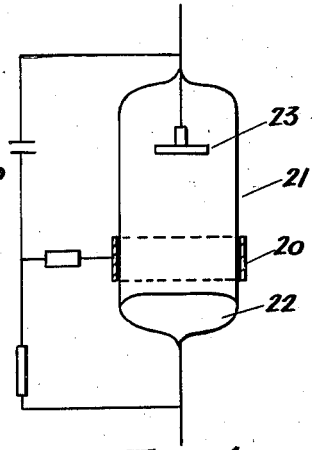
Figure 4 shows a modification of the drawing of Figure 3.
Figure 5:
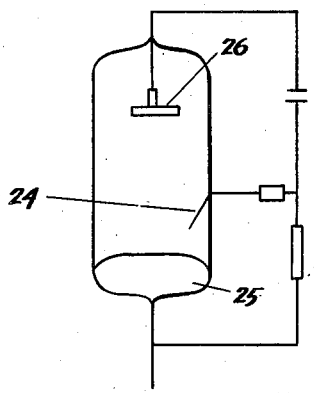
Figure 6:
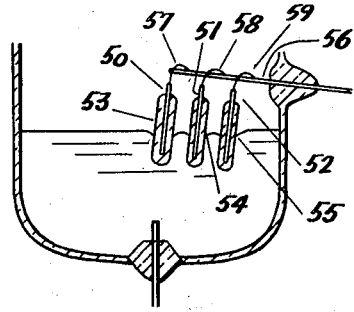

Figure 5 a still further modification of the device of Figure 4;

Figure 6 shows a further modification of the tube of Figure 3; and

Figure 7:
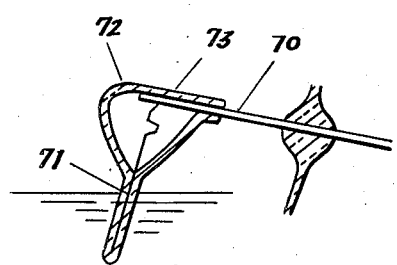

Figure 7 shows a further detail modification.

Figure 2:
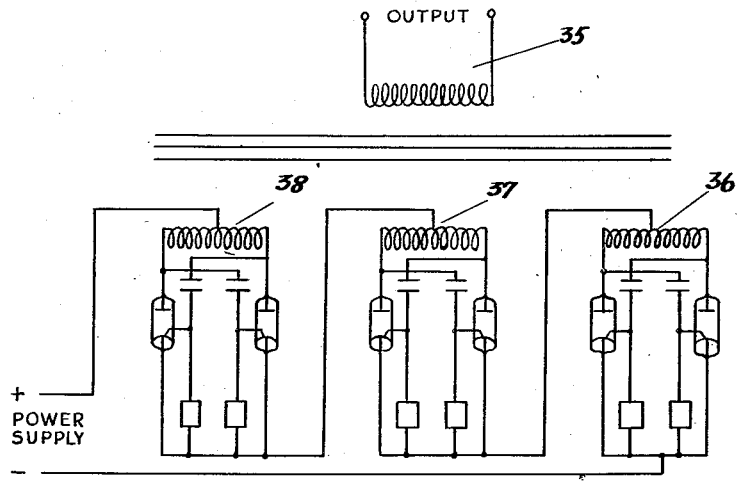
Figure 2 shows a similar type circuit used inversely as an inverter.
Figure 1:
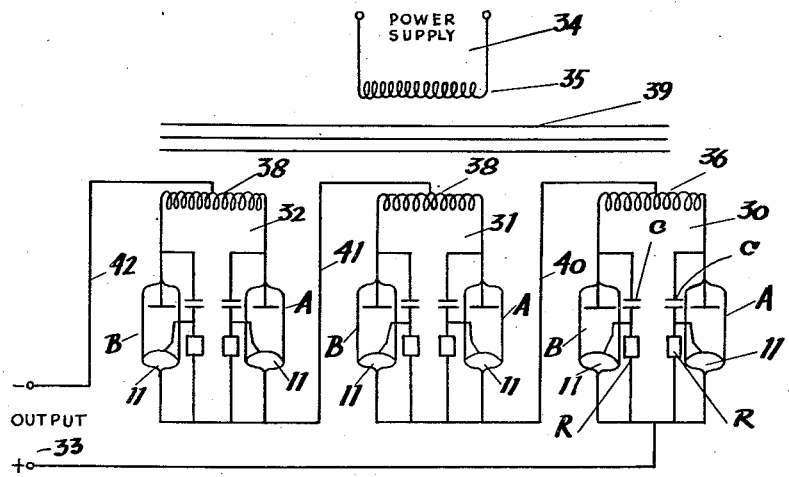
Figure 1 shows the present system as applied to a rectifier alternating current and converting it to a high voltage direct current.

Considering first the arrangement shown in Figure 3 which may apply to each of the tubes described in Figures 1 and 2, the tube 10 of Figure 3 may be a gaseous tube with a cathode 11 of a mercury pool and an anode 12 of some usual conducting material. The tube is provided with an auxiliary electrode 13 which is surrounded at its ends by a shield or cover 14 of some dielectric material such as glass, porcelain, fused quartz or insulating oxide.

The cathode and anode 11 and 12 respectively are connected together through a resistor R and a capacity C, the resistor R, having a very high resistance, and the capacity C having a very low capacitance. The electrode 13 is connected to the conductor joining the capacity and the resistor through a second resistance $R^1$ which may be chosen as desired, depending upon various desired effect. In fact the resistor $R^1$ may in cases be omitted and the electrode 13 connected directly to a point between the condenser C and the resistor R.

The circuit just described serves a double purpose. First the capacity and the resistor serve to divide the potential difference between the main anode and the main cathode 12 and 11 respectively, and to limit the voltage between the starting electrode and the cathode to such a value necessary to start the discharge, but not sufficient to cause a breakdown of the dielectric that surrounds the conducting starter core.

Secondly by the use of a capacity and resistor, the phase of the starter voltage as against the anode voltage is advanced and brings about a firing of the tube at the beginning of the alternating current cycle. A convenient size for capacity and resistance in a 20 kv. anode voltage connection would be about $R=10^9$ ohms $C=2 \times 10^{-12}$ F. This combination would limit the starter voltage to 3 kv. and at the same time allow a starting current of about $10^{-5}$ amperes to flow, which values are within the operating range of the glass igniter tubes. The wave shape of the starter voltage should preferably be made non-sinusoidally by the application of non-linear capacities or resistors. Further the starter voltage may be made peaked in one polarity and flat in the other polarity. In such an arrangement the starter voltage should be made peaked at the firing polarity and flat at the blocking polarity;

that is to say, the starting voltage should be peaked at the instant that the tube is energized with the proper polarity to bring about a current flow as the discharge in the tube occurs.

Following this in cycle, the starting voltage should be flat during the time that the polarity of the tube is such that no current is to flow, for the purpose of making the chances of dielectric breakdown of the starter more remote. Non-linear resistances which change their ohmic resistance as a function of the applied potential are quite common, and substances such as "Thyrite" or a glow discharge tube may be used.

A glow discharge tube when used should preferably be made non-symmetrical in its discharge operation by using electrodes of different materials and different sizes so that the discharge is sustained more easily in one direction than in the opposite, with the glow voltage in starting polarity slightly above the firing potential and the glow voltage in blocking polarity as low as possible. Since only a very small current is to flow through the glow discharge tube, its life would be practically unlimited. For the choice of non-linear capacities, piezo electric crystals of the Rochelle salt type may be used. By this means it is possible to vary in a high voltage circuit the wave shape in the same manner as it is in a current carrying circuit by the use of coils when wound on saturated iron cores.

In Figure 3 it will be noted that the primary P and secondaries S, S of the transformers in Figures 1 and 2 may be immersed in oil 80 in the tank 81 with the tube 10 and condenser C and resistances R and R¹, so that if the temperature of the oil becomes excessive, a condensive reactance C of the Rochelle salts crystal type, as explained later, may be used as a control element. In place of the use of a tube and circuit, described in Figure 3, the modification in Figure 4 may be used, in which the auxiliary electrode 20 is made in the form of a collar surrounding the tube 21 and dielectrically separated from the mercury pool 22 by means of the glass 21. Otherwise the tube corresponds similarly to that indicated in Figure 3 with the electrode 23 serving as the anode and the same electrical connections for the auxiliary 20 as previously described in Figure 3.

A further modification is shown in Figure 5 in which an auxiliary electrode 24 is used spaced apart from the mercury pool 25. Due to the positioning of the auxiliary electrode 24 with respect to the mercury pool 25, an electric field strength of great intensity is set up between the auxiliary electrode 24 and the mercury pool 25, although the voltage drop between the electrode 24 and 25 may be less than that between the electrode 25 and the anode 26. The discharge from the pool 25 to the auxiliary electrode 24 controls the discharge of the tube.

In Figures 1 and 2 are shown circuits for use respectively as rectifiers and inverters employing the gaseous tubes described in connection with Figures 3, 4 and 5. The system indicated in Figure 1 is for a full wave rectifier with three groups of tubes associated in the circuits respectively, 30, 31 and 32, which are similar to each other. These circuits or networks are connected in series with each other and with the output 33 indicated at the left of the figure. In Figure 1 power is supplied through the power transformer 34 which has a single primary 35 and three secondaries 36, 37 and 38, all of which may be wound on the same core with the primary 35 as indicated by the lines 39. Each winding 36, 37 and 38 is tapped at the center point and connected to the common conductor for the cathodes 11 of the following group as indicated by the conductors 40, 41, and the conductor 42 going to the negative side of the output. In each group 30, 31 and 32, first one tube A fires when the current flows in one direction in the transformers 36, 37 and 38, and the other tube B fires when the current reverses and flows in the other direction; that is to say, first the tubes labelled A operate, and then the tubes labelled B, operate, the current however being always in such a direction as to produce positive and negative potentials at the output as indicated in the figure.

Figure 2 shows the same system as applied to the inverter. In this case direct current power is supplied and alternating current is produced at the output of the transformer 35 through the same control system as indicated in Figure 1.

In Figure 6 is shown a tube of the type shown in Figure 3 except that several starting electrodes are used in this tube. It frequently happens in mercury pool tubes that the dielectric surrounding the conducting starter core breaks down electrically or that the mercury pool becomes dirty and "wets" the starter, that is to say, the meniscus of the mercury pool in the vicinity of the starter is changed by the presence of impurities in such a manner that the field strength at the surface of the mercury does not rise with the voltage applied to a value which will exceed the critical value of cold emission on which the formation of the cathode spot is based.

Electric breakdown or "shorting" of the starter insulation happens where the thickness of the insulation is preferably kept low in order to hold the starting voltage within bearable limits. In this case flaws occur quite commonly or at least develop along the insulator surface and bring about a breakdown in a relatively short time. If the starter has shorted, the whole tube is useless. While several starters with individual leads could be used, this design is expensive and would, in addition, mean an interruption of service while the new connection was being made.

In Figure 6 there is shown a group of starter electrodes 50, 51 and 52, each respectively having its insulating dielectric 53, 54 and 55. Each electrode 50, 51 and 52 is joined to the same holder 56 of conductive material by means of resistance elements 57, 58 and 59, respectively. The supports 57, 58 and 59 are preferably made of nickel or any resistive alloy or material that stands mercury vapor and has a comparatively low melting point. The use of these elements is not only to provide a fusible connection in case of breakdown, but also to provide a potential drop which instantly leads the discharge to the holder 56 during regular operation and thereby avoids current passing through the resistance.

The insulations 53, 54 and 55 may be extended up to the holder 56 to act as a support for each electrode and also as a shield against the discharge. This is shown in Figure 7 where the holder 70 supports the starting electrode 71 through an insulated and shielded support 72. In this case the electrode 71 is connected to the holder 70 by means of the resistance elements 73 which are fusible in the same manner as described in connection with Figure 6.

The ohmic resistance in line with the common starter lead 56 of the tube has such a resistance that it passes a current big enough to melt the connecting wires 57, 58 and 59 instantly when the respective starter insulation has failed. Such current should be, for instance, in this particular case in the neighborhood of 1 milliampere. This current is regularly flowing to the exposed holder 56 during every cycle just after the arc has struck. This means a small loss which could be prevented by a complete enclosure of connecting wires and holder, if necessary.

In a common type of dielectric starter, which is the glass starter, about 10 microamperes at around 500 volts are needed for each start. If the multiple arrangement consists of 10 individual starters, ten times this current or $\frac{1}{10}$ milliampere will flow during each start. With 1000 volts at the starter circuit as a safe value, one megohm as a series resistor would be a sufficient limitation for regular operation and still would pass enough current to fuse the connecting wire in case of a starter short.

After melting of the connecting wire the shorted starter falls on the mercury pool and after some time would be carried away to the wall by surface tension effect. As an alternative the disconnected starter could be held in place by an insulating connection to the holder. This would also be done if holder and wires are shielded as mentioned above.

A bundle of ten starters draws ten times the (dielectric) current a single starter would draw. If all ten starters are arranged near each other, a slight heating effect at the mercury surface will become notable both during the forward and inverse half cycle. Such heating effect is an active agent to keep the mercury surface clean in the immediate neighborhood of the starter tips. This effect is observable with single starters, but only with the described starter bundle is it really effective. If such a bundle were applied without the above-described melting lead device, it would mean that at the first short of a single starter in the bundle, which is hard to inspect or to make entirely flawless, the whole tube would become inoperative.

As a non-linear capacity C, Figure 3 may be crystals of the Rochelle salt type. The action of these crystals is such that with rising voltage (field strength) the dielectric constant of the crystal changes its value rather sharply. This phenomenon is the electrostatic analogy to the electromagnetic effect of iron saturation, where the magnetic permeability varies with magnetic field strength. Therefore, if the voltage across a Rochelle salt condenser varies in a sinusoidal manner, a peaked current will flow through it. In the circuit of this invention an ohmic resistor R, Figure 3, is in parallel to the starter and in series with the condenser. If the condenser is of the Rochelle salt type, a peaked charging current will flow through it while its voltage varies sinusoidally. This peaked current causes a peaked voltage drop across the resistor R and across the starter, thus making starting conditions more accurate.

Besides the above, the thermal effect in these crystals may be used as a protective means. When a certain temperature is reached, which depends on the composition of the crystal, the dielectric constant drops sharply. In the circuit as described, this means that when a certain temperature is reached, the starter voltage decreases sharply, and, likewise, if the transformer oil gets too hot, the tube stops firing. This effect thus provides a protection device.

Having now described my invention, I claim:

1. An electrical space discharge tube comprising an anode, an arc type cathode, and a firing electrode unit, said unit comprising a plurality of conducting members insulated from said cathode, each of said conducting members having a separate fusible conductor connecting said conducting member to an external connection.

2. An electrical space discharge tube comprising an anode, an arc type cathode, and a firing electrode unit, said unit comprising a plurality of conducting members insulated from said cathode, each of said conducting members having a separate fusible conductor connecting said conducting member to a common external connection.

3. A rectifier tube having a cold cathode, an anode, and a firing electrode, said electrode being composed of a plurality of similar conducting electrodes insulated from the cathode and each having a separate fusible conductive member connecting to the same external tube connection, said conductor members being fusible at an increased current resulting from the electric breakdown of the starting electrode.

4. An electrical space discharge tube comprising an anode, an arc type cathode, and a firing electrode unit, said unit comprising a plurality of firing electrode elements, each of said firing electrode elements having a separate fusible conductor connecting said firing electrode element to a common external connection.

5. An electrical space discharge tube comprising an anode, an arc type cathode, and a firing electrode unit, said unit comprising a plurality of firing electrode elements, each of said firing electrode elements having a separate fusible conductor connecting said firing electrode element to an external connection.

6. A rectifier tube having a mercury pool, a firing electrode and an anode, said firing electrode comprising a plurality of similar separate firing electrode elements, a common conductive element within the tube and separate conductive means connecting to each firing electrode element, said conductive means being fusible at a temperature normally occurring when the separate firing electrode element becomes shorted in the tube.

7. An electrical space discharge tube comprising an anode, an arc type cathode, and a firing electrode unit, said unit comprising a plurality of firing electrode elements, and conductive means, each of said firing electrode elements having a separate fusible conductor supporting said electrode element and connecting said firing electrode element to said conductive means.

8. A rectifier tube having a mercury pool, a firing electrode, and an anode, said firing electrode comprising a plurality of similar separate firing electrode elements, a common conductive holding element within the tube, and separate conductive means physically supporting said separate conductive means and said separate firing electrode elements and being fusible at a temperature normally occurring when the separate firing electrode becomes shorted in the tube.

9. An electrical space discharge tube comprising an anode, an arc type cathode, an arc spot initiating type firing electrode unit, said unit comprising a plurality of conducting members insulated from said cathode, and common conductive means, each of said conducting members having a separate resistance element connecting said conducting member to said common conductive means.

10. A rectifier tube having a mercury pool, a firing electrode and an anode, said firing electrode comprising a plurality of similar starting conducting electrode elements insulated from the mercury pool and individual resistive elements connecting to a common electrode whereby when discharge occurs, said discharge is conducted immediately to the common electrode.

11. An electrical space discharge tube comprising an anode, an arc type cathode, an arc spot initiating type firing electrode unit, said unit comprising a plurality of conducting members insulated from said cathode, common conductive means, said conducting members having resistance means connecting said conducting members to said common conductive means, and means supporting and insulating said conducting members.

12. A rectifier tube having a mercury pool, an arc spot initiating type firing electrode and an anode, said firing electrode comprising a plurality of similar separate starting electrode elements, a common electrode and resistive means connecting said starting electrode elements to said common electrode, and means supporting and insulating said starting electrode elements.

13. A rectifier tube having a mercury pool, a firing electrode and an anode, said firing electrode comprising a plurality of similar separate starting electrode elements positioned adjacent one another for concentrating the heating effect on the pool, a common electrode and resistive means connecting said starting electrode elements to said common electrode, and means supporting and insulating said starting electrode elements.

14. A rectifier tube having a mercury pool, a firing electrode, and an anode, said firing electrode comprising a plurality of similar firing electrode elements, a common conductive holding element within the tube and fusible resistive members electrically connecting the separate firing electrode to the common holding element, said fusible members supporting the separate firing electrode elements from the holding elements and being fusible at a temperature normally occurring when the separate firing electrode becomes shorted in the tube.

15. An electrical space discharge tube comprising an anode, a pool type cathode, and an igniting structure, said igniting structure comprising a plurality of conducting members insulated and separated from said cathode by an insulating layer, each of said conducting members being connected to an external connection, and means responsive to a breakdown of said insulating layer adjacent said cathode resulting in increased current flow for disconnecting said conducting member from said external connection.

16. An electrical space discharge tube comprising an anode, a pool type cathode, and an igniting structure, said igniting structure comprising a plurality of conducting members insulated and separated from said cathode by an insulating layer, each of said conducting members being connected to a common external connection, and means responsive to a breakdown of said insulating layer adjacent said cathode resulting in increased current flow for disconnecting said conducting members from said external connection.

17. An electrical space discharge tube comprising an anode, a pool type cathode, and an igniting structure, said igniting structure comprising a plurality of igniting elements, each of said igniting elements being connected to an external connection, and means responsive to a breakdown which substantially decreases the impedance of any igniting element for disconnecting said igniting element from said external connection.

18. An electrical space discharge tube comprising an anode, a pool type cathode, and an igniting structure, said igniting structure comprising a plurality of igniting elements, each of said igniting elements being connected to a common external connection, and means responsive to a breakdown which substantially decreases the impedance of any igniting element for disconnecting said igniting element from said external connection.

19. An electrical space discharge tube comprising an anode, a pool type cathode, an igniting structure, said igniting structure comprising a plurality of igniting elements, each of said igniting elements having a fusible conductor connecting said conducting member to an external connection, each of said fusible conductors being fusible at an increased current resulting from the electrical breakdown of its associated igniting element.

20. An electrical space discharge tube comprising an anode, a pool type cathode, an igniting structure, said igniting structure comprising a plurality of conducting members insulated and separated from said cathode by an insulating layer, each of said conducting members being connected to an external connection, each of said fusible conductors being fusible at an increased current resulting from the electrical breakdown of its associated igniting element.

HANS KLEMPERER.